US010533688B2

(12) United States Patent
Sith et al.

(10) Patent No.: US 10,533,688 B2
(45) Date of Patent: Jan. 14, 2020

(54) COUPLING HAVING TABBED RETAINER

(71) Applicant: Victaulic Company, Easton, PA (US)

(72) Inventors: Ahmad Sith, Bethleham, PA (US); Matthew A. Bowman, Palmer, PA (US); Scott D. Madara, Nazareth, PA (US)

(73) Assignee: Victaulic Company, Easton, PA (US)

( * ) Notice: Subject to any disclaimer, the term of this patent is extended or adjusted under 35 U.S.C. 154(b) by 243 days.

(21) Appl. No.: 15/593,673

(22) Filed: May 12, 2017

(65) Prior Publication Data
US 2017/0328505 A1 Nov. 16, 2017

Related U.S. Application Data

(60) Provisional application No. 62/336,885, filed on May 16, 2016.

(51) Int. Cl.
*F16L 37/091* (2006.01)

(52) U.S. Cl.
CPC .................. *F16L 37/0915* (2016.05)

(58) Field of Classification Search
CPC ......... F16L 17/02; F16L 17/03; F16L 17/035; F16L 17/04; F16L 21/06; F16L 37/0925
USPC .......................... 285/112, 108, 340, 345, 367
See application file for complete search history.

(56) References Cited

U.S. PATENT DOCUMENTS

| 285,179 A | 9/1883 | Tibbals |
| 1,020,123 A | 3/1912 | Brampton et al. |
| 1,074,395 A | 9/1913 | Welch |
| 1,203,989 A | 11/1916 | Dehn |
| 1,287,108 A | 12/1918 | Robinson et al. |
| 1,379,811 A | 5/1921 | Fyffe |
| 1,497,549 A | 6/1924 | Conradi |
| 1,649,594 A | 11/1927 | Johnson |
| 1,770,271 A | 7/1930 | Hoppes |
| 1,831,641 A | 11/1931 | Skinner |

(Continued)

FOREIGN PATENT DOCUMENTS

| CN | 102345774 | 2/2012 |
| CN | 102933886 | 2/2013 |

(Continued)

OTHER PUBLICATIONS

Copenheaver, Blane R.; International Search Report from counterpart International Patent Application No. PCT/US2017/032588, dated Jul. 21, 2017, pp. 1-2, United States Patent and Trademark Office as Searching Authority, Alexandria, Virginia USA.

(Continued)

*Primary Examiner* — Aaron M Dunwoody
(74) *Attorney, Agent, or Firm* — Ballard Spahr, LLP

(57) ABSTRACT

A pipe coupling for plain end pipe is formed of segments joined end to end surrounding a central space. The segments are connected end to end by lugs on each segment with fasteners extending between them. Each segment has channels on opposite sides that face the central space with floors at different radii. Retainers are received within the channels. The retainers have teeth and one or more offset tabs that cooperate with the channels to prevent improper assembly. A ring seal is received within a channel positioned in each segment between the retainer channels.

41 Claims, 7 Drawing Sheets

(56) References Cited

U.S. PATENT DOCUMENTS

| | | | |
|---|---|---|---|
| 1,969,043 A | 8/1934 | Sham | |
| 1,999,045 A | 4/1935 | Goetz | |
| 2,021,081 A | 11/1935 | Nagao | |
| 2,021,082 A | 11/1935 | North | |
| 2,094,258 A | 9/1937 | Thompson | |
| 2,128,720 A | 8/1938 | Tweedale | |
| 2,225,208 A * | 12/1940 | Crickmer | F16L 17/04 285/104 |
| 2,412,394 A | 12/1946 | Giles | |
| 2,426,423 A | 8/1947 | Woolsey | |
| 2,459,251 A * | 1/1949 | Stillwagon | F16L 17/04 285/104 |
| 2,463,235 A | 3/1949 | Andrews | |
| 2,491,004 A * | 12/1949 | Graham | F16L 17/04 285/105 |
| 2,635,901 A * | 4/1953 | Osborn | F16L 27/023 285/105 |
| 1,775,806 A | 1/1957 | Love | |
| 2,926,028 A * | 2/1960 | Hookings | F16L 17/035 285/111 |
| 2,958,546 A | 11/1960 | Lee | |
| 3,014,259 A | 12/1961 | Joseph | |
| 3,116,078 A * | 12/1963 | Scherer | F16L 17/04 285/104 |
| 3,148,896 A | 9/1964 | Chu | |
| 3,153,550 A | 10/1964 | Hollett | |
| 3,235,293 A | 2/1966 | Condon | |
| 3,362,730 A | 1/1968 | Clair et al. | |
| 3,466,069 A | 9/1969 | Hoke et al. | |
| 3,517,701 A | 6/1970 | Smith | |
| 3,596,935 A | 8/1971 | McGeoch | |
| 3,633,943 A | 1/1972 | Ramm | |
| 3,680,894 A | 8/1972 | Young | |
| 3,788,677 A | 1/1974 | Stade et al. | |
| 3,794,360 A | 2/1974 | Bachle et al. | |
| 3,825,286 A | 7/1974 | Henry, III | |
| 3,861,723 A | 1/1975 | Kunz et al. | |
| 3,920,270 A | 11/1975 | Babb, Jr. | |
| 3,944,260 A | 3/1976 | Petroczky | |
| 4,018,979 A | 4/1977 | Young | |
| 4,073,514 A * | 2/1978 | Pate | F16L 37/091 285/149.1 |
| 4,119,333 A | 10/1978 | Straub | |
| 4,123,090 A * | 10/1978 | Kotsakis | F16L 37/0915 285/340 |
| 4,181,329 A | 1/1980 | Helm | |
| 4,225,160 A | 9/1980 | Ortloff | |
| 4,273,367 A | 6/1981 | Keeney et al. | |
| 4,284,298 A | 8/1981 | Kaufmann, Jr. | |
| 4,443,029 A | 4/1984 | Laxo | |
| 4,461,498 A * | 7/1984 | Kunsman | F16L 57/06 285/112 |
| 4,471,979 A | 9/1984 | Gibb et al. | |
| 4,611,839 A | 9/1986 | Rung et al. | |
| 4,629,217 A | 12/1986 | Straub | |
| 4,633,913 A | 1/1987 | Carty et al. | |
| 4,639,020 A | 1/1987 | Rung et al. | |
| 4,652,023 A | 3/1987 | Timmons | |
| 4,664,422 A | 5/1987 | Straub | |
| 4,678,208 A | 7/1987 | DeRaymond | |
| 4,792,160 A | 12/1988 | Hwang | |
| 4,819,974 A | 4/1989 | Zeidler | |
| 4,838,584 A | 6/1989 | Dierksmeier | |
| 4,842,306 A | 6/1989 | Zeidler et al. | |
| 4,861,075 A | 8/1989 | Pepi et al. | |
| 4,893,843 A | 1/1990 | DeRaymond | |
| 4,896,902 A | 1/1990 | Weston | |
| 4,898,407 A | 2/1990 | Zeidler | |
| 5,018,768 A | 5/1991 | Palatchy | |
| 5,022,685 A | 6/1991 | Stiskin et al. | |
| 5,121,946 A | 6/1992 | Jardine | |
| 5,137,305 A | 8/1992 | Straub | |
| 5,161,836 A | 11/1992 | McKinnon | |
| 5,203,594 A | 4/1993 | Straub | |
| 5,230,537 A | 7/1993 | Newman | |
| 5,273,322 A | 12/1993 | Straub | |
| 5,280,970 A | 1/1994 | Straub | |
| 5,452,922 A | 9/1995 | Ziu | |
| 5,603,350 A | 2/1997 | Stoll et al. | |
| 5,605,865 A | 2/1997 | Maniar et al. | |
| 5,675,873 A | 10/1997 | Groess | |
| 5,681,062 A * | 10/1997 | Fukao | F16L 21/08 285/340 |
| 5,722,702 A | 3/1998 | Washburn | |
| 5,758,907 A | 6/1998 | Dole et al. | |
| 5,769,467 A | 6/1998 | Bridges | |
| 5,772,257 A | 6/1998 | Webb et al. | |
| 5,782,499 A | 7/1998 | Gfrerer et al. | |
| 5,786,054 A | 7/1998 | Platusich et al. | |
| 5,813,437 A | 9/1998 | Esser | |
| 5,911,446 A * | 6/1999 | McLennan | F16L 21/08 285/104 |
| 5,961,154 A | 10/1999 | Williams et al. | |
| 6,030,006 A | 2/2000 | Lin | |
| 6,056,332 A | 5/2000 | Foster | |
| 6,276,726 B1 | 8/2001 | Daspit | |
| 6,276,729 B1 | 8/2001 | Sanwald et al. | |
| 6,305,719 B1 | 10/2001 | Smith, Jr. et al. | |
| 6,328,352 B1 | 12/2001 | Geppert et al. | |
| 6,367,849 B1 | 4/2002 | Tatsuta et al. | |
| 6,450,551 B1 | 9/2002 | Lee | |
| 6,499,771 B1 * | 12/2002 | Snyder, Sr. | F16L 37/0915 285/319 |
| 6,502,865 B1 * | 1/2003 | Steele | F16L 17/04 285/112 |
| 6,505,865 B2 | 1/2003 | Minemyer | |
| 6,626,456 B2 | 9/2003 | Terbu et al. | |
| 6,672,631 B1 | 1/2004 | Weinhold | |
| 6,749,232 B2 | 6/2004 | Wachter et al. | |
| 7,070,209 B2 | 7/2006 | Collins | |
| 7,086,131 B2 | 8/2006 | Gibb et al. | |
| 7,341,287 B2 | 3/2008 | Gibb et al. | |
| 7,434,846 B2 * | 10/2008 | Baumgartner | F16L 37/091 285/104 |
| 7,490,866 B2 | 2/2009 | Webb et al. | |
| 7,500,699 B2 | 3/2009 | Snyder, Sr. et al. | |
| 7,523,963 B2 | 4/2009 | Draper et al. | |
| 7,644,960 B2 | 1/2010 | Casey, Sr. et al. | |
| 7,654,587 B2 | 2/2010 | Gibb et al. | |
| 7,712,796 B2 | 5/2010 | Gibb | |
| 7,726,703 B2 | 6/2010 | Porter et al. | |
| 7,748,753 B2 | 7/2010 | Krausz et al. | |
| 7,789,434 B2 | 9/2010 | Nagle et al. | |
| 7,798,535 B2 | 9/2010 | Calhoun | |
| 7,841,630 B1 * | 11/2010 | Auray | F16L 5/06 285/151.1 |
| 7,861,982 B1 | 1/2011 | McClure | |
| 7,866,707 B2 | 1/2011 | Sudar | |
| 8,424,179 B2 * | 4/2013 | Webb | B25B 27/10 285/237 |
| 8,820,795 B2 | 9/2014 | Dole | |
| 8,827,214 B2 | 9/2014 | Ogawa | |
| 9,890,884 B1 | 2/2018 | Chiproot | |
| 9,976,677 B2 | 5/2018 | Lurk | |
| 9,979,103 B2 | 5/2018 | Pari | |
| 2002/0135184 A1 | 9/2002 | Snyder, Sr. et al. | |
| 2002/0185868 A1 | 12/2002 | Snyder, Sr. et al. | |
| 2003/0020276 A1 | 1/2003 | Steele | |
| 2004/0237632 A1 | 12/2004 | Van Keeken | |
| 2005/0001428 A1 | 1/2005 | Scherrer | |
| 2005/0028366 A1 | 2/2005 | Bien et al. | |
| 2005/0067538 A1 | 3/2005 | Stigler | |
| 2005/0082831 A1 | 4/2005 | Borland | |
| 2005/0253380 A1 | 11/2005 | Gibb et al. | |
| 2006/0138776 A1 | 6/2006 | Amedure et al. | |
| 2006/0214422 A1 | 9/2006 | Cuvo et al. | |
| 2007/0024056 A1 | 2/2007 | Borland | |
| 2008/0265568 A1 | 10/2008 | Bekkevold | |
| 2008/0272595 A1 | 11/2008 | Gibb et al. | |
| 2009/0127846 A1 | 5/2009 | Dole et al. | |
| 2009/0160183 A1 | 6/2009 | Felber | |
| 2009/0172939 A1 | 7/2009 | Dole | |
| 2009/0206598 A1 | 8/2009 | Gibb et al. | |

(56) References Cited

U.S. PATENT DOCUMENTS

| | | |
|---|---|---|
| 2010/0115733 A1 | 5/2010 | Bouchiat et al. |
| 2010/0320756 A1 | 12/2010 | Gibb et al. |
| 2010/0320758 A1 | 12/2010 | Sisk |
| 2010/0327576 A1 | 12/2010 | Linhorst et al. |
| 2011/0062706 A1 | 3/2011 | Henry |
| 2011/0154646 A1 | 6/2011 | Hagiya |
| 2011/0254268 A1 | 10/2011 | Johnson et al. |
| 2012/0074689 A1 | 3/2012 | Petersen et al. |
| 2012/0098259 A1 | 4/2012 | Sarkisian et al. |
| 2012/0205909 A1 | 8/2012 | Bird |
| 2012/0235405 A1 | 9/2012 | Dole et al. |
| 2012/0256415 A1 | 10/2012 | Dole |
| 2012/0306118 A1 | 12/2012 | Hayashyi et al. |
| 2013/0306118 A1 | 7/2013 | Le Clinche |
| 2013/0327415 A1 | 12/2013 | Camp, Jr. et al. |
| 2014/0327238 A1* | 11/2014 | Bowman .............. F16L 17/04 285/112 |
| 2015/0021911 A1* | 1/2015 | Bowman .............. F16L 21/005 285/340 |
| 2015/0176728 A1* | 6/2015 | Bowman .............. F16L 21/065 285/309 |
| 2015/0204471 A1 | 7/2015 | Sato |
| 2016/0084420 A1 | 3/2016 | Barrientos |
| 2017/0184226 A1* | 6/2017 | Cuvo .................. F16L 17/04 |
| 2017/0328500 A1* | 11/2017 | Bowman .............. F16L 23/036 |
| 2017/0328507 A1* | 11/2017 | Sith .................... F16L 17/04 |
| 2018/0163905 A1 | 6/2018 | Ohnemus et al. |
| 2018/0163906 A1 | 6/2018 | Ohnemus et al. |
| 2019/0032824 A1 | 1/2019 | McNamara et al. |
| 2019/0032825 A1 | 1/2019 | McNamara et al. |

FOREIGN PATENT DOCUMENTS

| | | |
|---|---|---|
| CN | 105423015 | 3/2016 |
| CN | 105473923 | 4/2016 |
| DE | 3111997 | 10/1982 |
| DE | 3443943 | 6/1985 |
| DE | 19532356 | 4/1996 |
| DE | 10006029 | 8/2001 |
| EP | 0462454 | 12/1991 |
| EP | 2113701 | 11/2009 |
| EP | 1840439 | 6/2010 |
| EP | 2487397 | 8/2012 |
| FR | 2683017 | 4/1993 |
| FR | 2747453 | 4/1997 |
| FR | 2921985 | 3/2013 |
| GB | 2098297 | 11/1982 |
| GB | 2211255 | 6/1989 |
| JP | S524772 | 2/1993 |
| JP | 07269764 | 10/1995 |
| JP | 2001304468 | 10/2001 |
| JP | 2006250247 | 9/2006 |
| JP | 2007537414 | 12/2007 |
| JP | 2011163474 | 8/2011 |
| JP | 2012189147 | 10/2012 |
| KR | 100315861 | 11/2001 |
| KR | 1020090007813 | 1/2009 |
| KR | 100904419 | 6/2009 |
| KR | 1020090066767 | 6/2009 |
| WO | 199703811 | 2/1997 |
| WO | 2005114023 | 12/2005 |
| WO | 2013115963 | 8/2013 |

OTHER PUBLICATIONS

Copenheaver, Blane R.; Written Opinion from counterpart International Patent Application No. PCT/US2017/032588, dated Jul. 21, 2017, pp. 1-5, United States Patent and Trademark Office as Searching Authority, Alexandria, Virginia USA.

* cited by examiner

COUPLING HAVING TABBED RETAINER

CROSS REFERENCE TO RELATED APPLICATION

This application is based upon and claims priority to U.S. Provisional Application No. 62/336,885, filed May 16, 2016 and hereby incorporated by reference.

FIELD OF THE INVENTION

This invention relates to pipe couplings for joining plain end pipe elements.

BACKGROUND

Mechanical couplings for joining plain end pipe elements together end-to-end comprise interconnectable segments that are positionable circumferentially surrounding the end portions of co-axially aligned pipe elements. The term "pipe element" is used herein to describe any pipe-like item or component having a pipe-like form. Pipe elements include pipe stock, pipe fittings such as elbows, caps and tees as well as fluid control components such as valves, reducers, strainers, restrictors, pressure regulators and the like.

Each mechanical coupling segment comprises a housing having projections which extend inwardly from the housing. Toothed retainers may be used to form the projections for couplings for plain end pipe elements. When the retainers are properly oriented in the segments, engagement between the teeth and the pipe elements provides mechanical restraint to the joint and ensures that the pipe elements remain coupled even under high internal pressure and/or external forces. The housings also define an annular channel or pocket that receives a ring gasket or seal, typically an elastomeric ring which engages the ends of each pipe element and cooperates with the segments and the pipe elements to provide a fluid tight seal. The segments have connection members, typically in the form of lugs which project outwardly from the housings. The lugs are adapted to receive fasteners, such as nuts and bolts, which are adjustably tightenable to draw the segments toward one another.

Some retainers use teeth that are angularly oriented with respect to a line extending radially from an axis coaxial with the central space. The proper angular orientation allows the teeth to be "self-actuating", i.e., the mechanical engagement between the teeth and the pipe elements increases with increasing force on the pipe elements trying to draw or push them out of the coupling. Hence, the force resisting withdrawal increases with the applied force that would otherwise cause withdrawal. However, if such retainers are oriented improperly, for example, if the retainer is reversed within the coupling, then the teeth will not be self-actuating against forces which would draw or push the pipe element out of the coupling. Thus the retainer would not provide sufficient mechanical engagement against withdrawal and the pipe elements will not be securely held within the coupling. For couplings having retainers it is difficult to determine if the retainers are properly oriented once the coupling has been installed. It would be advantageous if pipe couplings could be designed so that the user is alerted if the retainer is not properly oriented during assembly of the joint.

SUMMARY

The invention concerns a coupling for joining pipe elements. In one example embodiment the coupling comprises a plurality of segments attached to one another end to end surrounding a central space for receiving the pipe elements. By way of example there may be no more than a first and a second segment. Each of the segments comprises first and second channels positioned on opposite sides of the segments. Each of the channels extends between the ends of the segments and has a first floor and a second floor facing the central space. The first floor has a greater radius of curvature than the second floor. First and second retainers are positioned respectively in the first and second channels. Each of the retainers comprises a band having oppositely disposed ends. A plurality of teeth are positioned along one edge of the band and project toward the central space. At least one tab is positioned along an opposite edge of the band. The band overlies the first floor, and the tab overlies the second floor when the retainers are positioned within the channels. A plurality of tabs is advantageous.

The example coupling further comprises a third channel positioned within each of the segments. The third channels face the central space. A ring seal is positioned within the third channels. The ring seal has an inner surface sized to receive said pipe elements and may have an outer surface sized to support the segments in spaced apart relation sufficient to permit insertion of the pipe elements into the central space while the segments are attached to one another. By way of further example the retainer bands may be sized to cooperate with the ring seals to support the housing portions in spaced apart relation.

In a particular example embodiment the third channels are positioned between the first channels and the second channels or adjacent to the first channel if the second channel is not present. By way of further example, the teeth are oriented angularly with respect to a line extending radially from an axis coaxial with the central space. Further by way of example, the tab or tabs are oriented perpendicular to a line extending radially from an axis coaxial with the central space. In a specific example the tab or tabs project toward the third channels.

Another example coupling embodiment further comprises a first aperture in at least one of the segments. The first aperture provides a line of sight toward the central space, and may be aligned with the first channel. In a specific example embodiment the first aperture is positioned between two of the segments. The aperture may comprise a trough at the interface between the segments. Further by way of example a second aperture is positioned in at least one of the segments. The second aperture provides a line of sight toward the central space and may be aligned with the second channel. In a specific example the second aperture is positioned between two of the segments. The second aperture may comprise a trough at the interface between the segments.

Another example embodiment comprises first and second attachment members positioned at opposite ends of the segments. At least one of the attachment members is adjustably tightenable for drawing the first and second segments toward one another. In one example embodiment the first attachment member comprises first and second lugs positioned respectively on the first and second segments. The first and second lugs are in facing relation. A first fastener extends between the first and second lugs. Tightening of the first fastener draws the segments toward one another. In another example embodiment the second attachment member comprises third and fourth lugs positioned respectively on the first and second segments. The third and fourth lugs are in facing relation. A second fastener extends between the third and fourth lugs. Tightening of the second fastener draws the segments toward one another.

The invention further encompasses a coupling for joining pipe elements which, by way of example, comprises a plurality of segments (for example, no more than a first and a second segment) attached to one another end to end surrounding a central space for receiving the pipe elements. In this example embodiment each of the segments comprises at least one channel positioned on one side of the segments. The at least one channel extends between the ends of the segments and has a first floor and a second floor facing the central space. The first floor has a greater radius of curvature than the second floor. A retainer is positioned in the at least one channel. The retainer comprises a band having oppositely disposed ends. A plurality of teeth are positioned along one edge of the band and project toward the central space. At least one tab is positioned along an opposite edge of the band. The band overlies the first floor, the tab overlies the second floor when the retainer is positioned within the at least one channel. A plurality of tabs is advantageous.

The invention further encompasses a method of joining pipe elements. In one example embodiment the method comprises:

inserting at least a first pipe element into a central space defined by a plurality of segments attached to one another end to end in spaced relation sufficient to permit insertion of the pipe elements; and observing, through a first aperture in at least one of the segments, whether or not the first pipe element is present within the central space.

The example method may further comprise:

inserting at least a second pipe element into the central space; and observing, through a second aperture in at least one of the segments, whether or not the second pipe element is present within the central space.

Additionally by way of example, the method according to the invention may further comprise:

adjusting positions of the pipe elements within the central space if the pipe elements are not present within the central space; and drawing the segments toward the central space and into engagement with the pipe elements once the pipe elements are observed to be present within the central space.

DETAILED DESCRIPTION

Figure 1:
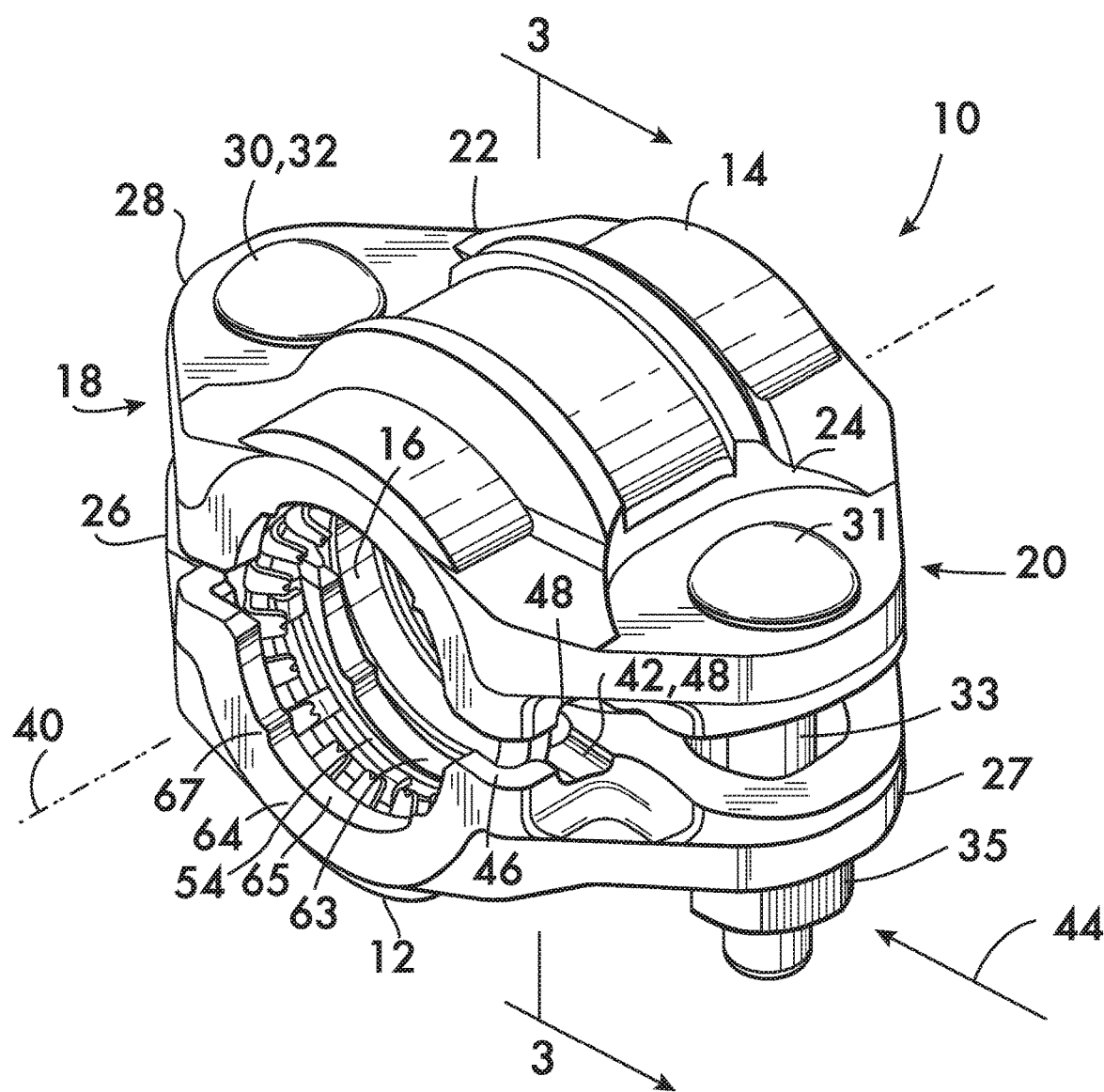
FIG. 1 is an isometric view of an example embodiment of a coupling according to the invention.
Figure 2:
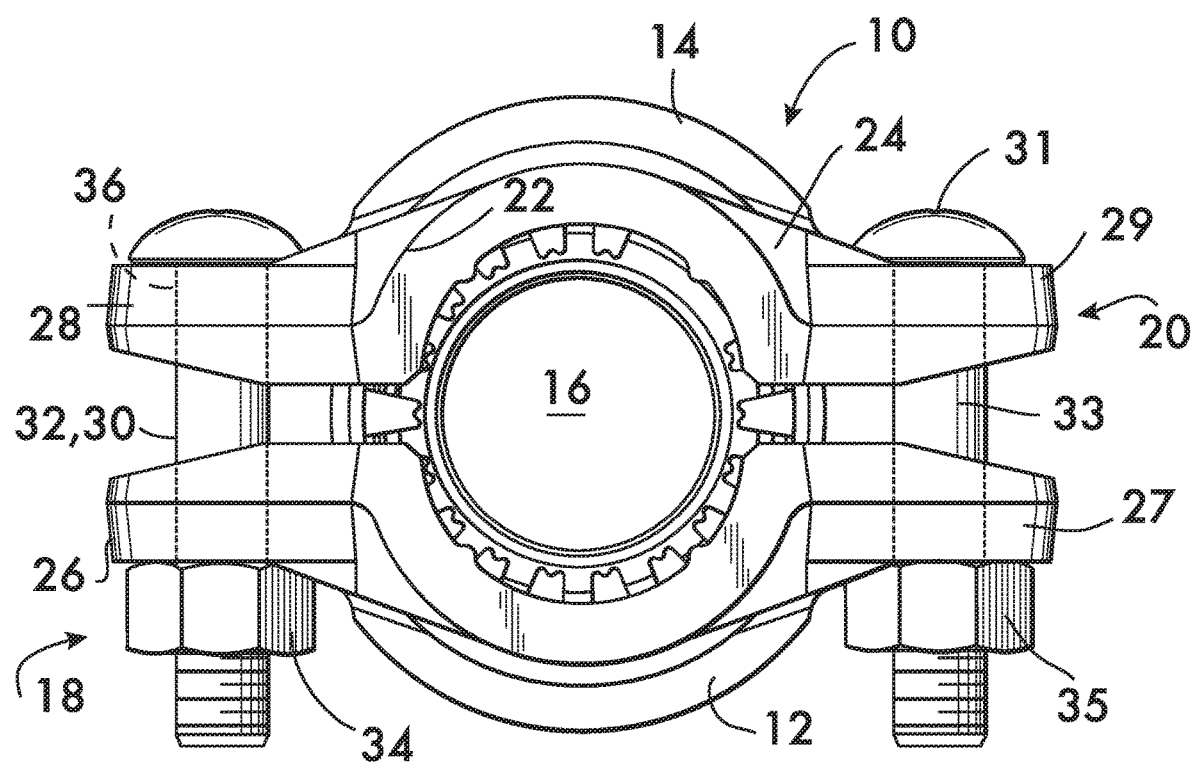
FIG. 2 is an axial view of the example coupling shown in FIG. 1.

FIGS. 1 and 2 show an example coupling 10 according to the invention. Coupling 10 comprises a plurality of segments, in this example embodiment, first and second segments 12 and 14, attached to one another end to end surrounding a central space 16. Attachment of segments 12 and 14 is effected by first and second attachment members 18 and 20 positioned at respective opposite ends 22 and 24 of segments 12 and 14. In this example embodiment the first attachment member 18 comprises first and second lugs 26 and 28, and a fastener 30 comprising a bolt 32 and a nut 34 (see FIG. 2). Lugs 26 and 28 are in facing relation to one another and extend from ends 22 of respective segments 12 and 14. The lugs have holes 36 which receive a first fastener 30, the fastener extending between the first and second lugs. Comprised of lugs 26, 28 and fastener 30, the first attachment member is adjustably tightenable for drawing the segments 12 and 14 toward one another to join pipe elements as described below. Further in this example embodiment, the second attachment member 20 comprises third and fourth lugs 27 and 29, and a second fastener 31 comprising a bolt 33 and a nut 35. Lugs 27 and 29 are in facing relation to one another and extend from ends 24 of respective segments 12 and 14. The lugs have holes 36 which receive a second fastener 31, the fastener extending between the third and fourth lugs. Comprised of lugs 27, 29 and fastener 31, the second attachment member is also adjustably tightenable for drawing the segments 12 and 14 toward one another to join pipe elements as described below.

Figure 3:
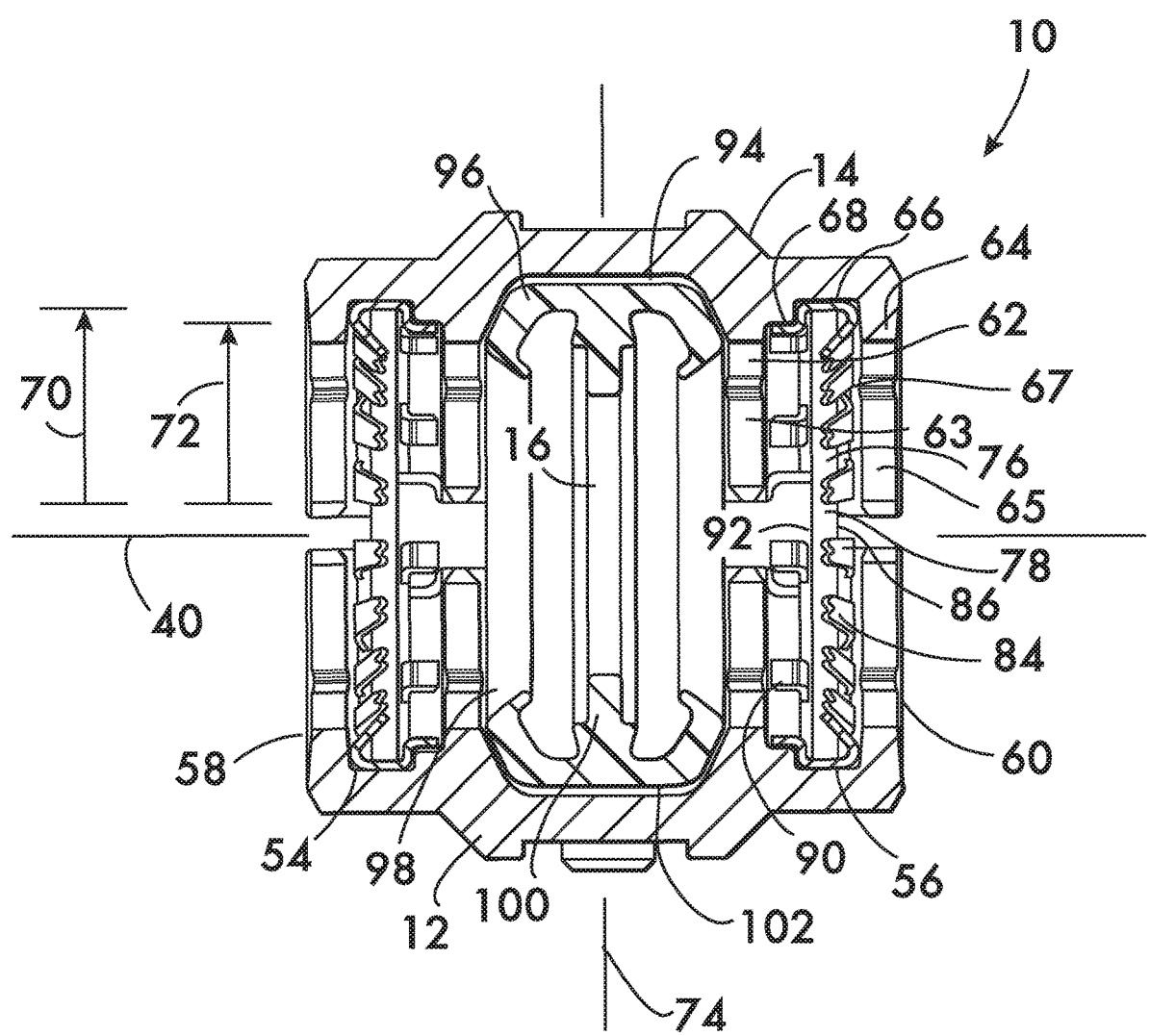
FIG. 3 is a cross sectional view taken at line 3-3 of FIG. 1.
Figure 4:
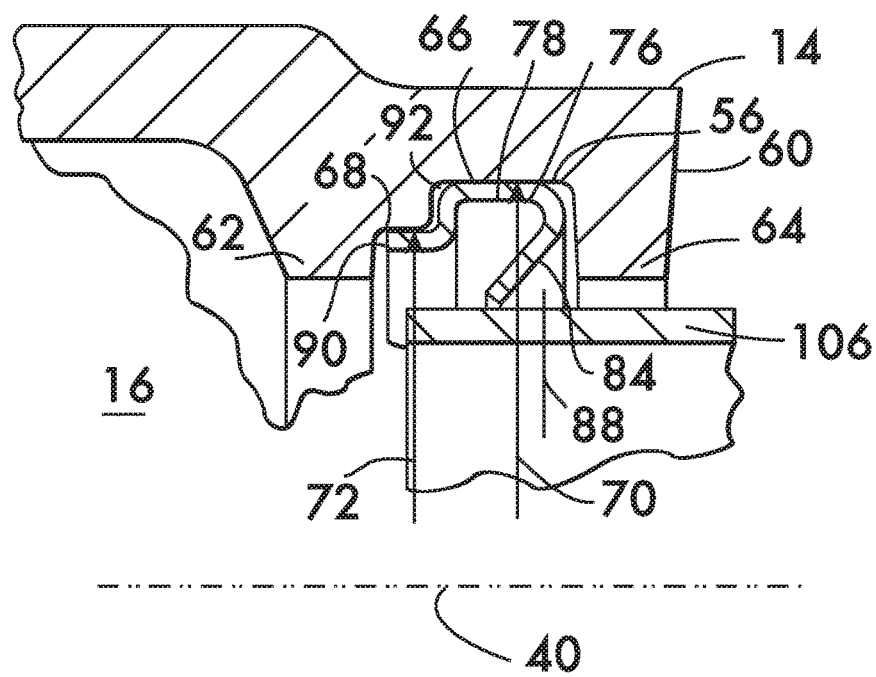
FIG. 4 is a partial sectional view of a portion of the example coupling shown in FIG. 1.

As shown in cross section in FIG. 3 each segment 12 and 14 comprises first and second channels 54 and 56 respectively positioned on opposite sides 58 and 60 of each segment. The first and second channels 54 and 56 extend between the ends 22 and 24 of segments 12 and 14 (see FIG. 1) and face the central space 16. As shown in detail in FIG. 4, each channel 54, 56 (channel 56 in segment 14 being shown) is defined by sidewalls 62 and 64 positioned in spaced relation to one another. Each channel 54, 56 furthermore has first and second floors 66 and 68 located between sidewalls 62 and 64. Floors 66 and 68 face the central space 16 and are arcuate in shape as they extend between the ends 22 and 24 of the segments 12 and 14. As shown in FIG. 4, first floor 66 is positioned closer to the side 60 of segment 14 and has a greater radius of curvature 70 than the second floor 68, which has a radius of curvature 72. As shown in FIG. 3, the channels 54 and 56 and the arrangement of their floors 66 and 68 are symmetric about the axis 74 extending transversely through the coupling 10.

As further shown in FIGS. 3 and 4, the channels 54 and 56 each receive a respective retainer 76. Retainer 76 is shown in detail in FIG. 5 and comprises an arcuate band 78 having oppositely disposed ends 80 and 82. Band 78 is thus forms a "split ring" which, when compressed radially will deform to a smaller radius of curvature (see FIG. 8). In some embodiments, each band 78 is sized such that contact between bands 78 and the respective segments 12 and 14 within channels 54 and 56 allow one or both bands 78 to support segments 12 and 14 in spaced apart relation as shown in FIG. 1. A plurality of teeth 84 are positioned along one edge 86 of band 78. Teeth 84 project from band 78 toward the central space 16. As shown in FIGS. 3 and 4, teeth 84 are oriented angularly toward axis 74 with respect to a line 88 extending radially from an axis 40 arranged coaxially with the central space 16. The angular orientation is advantageous for retaining pipe elements as described below.

Figure 5:
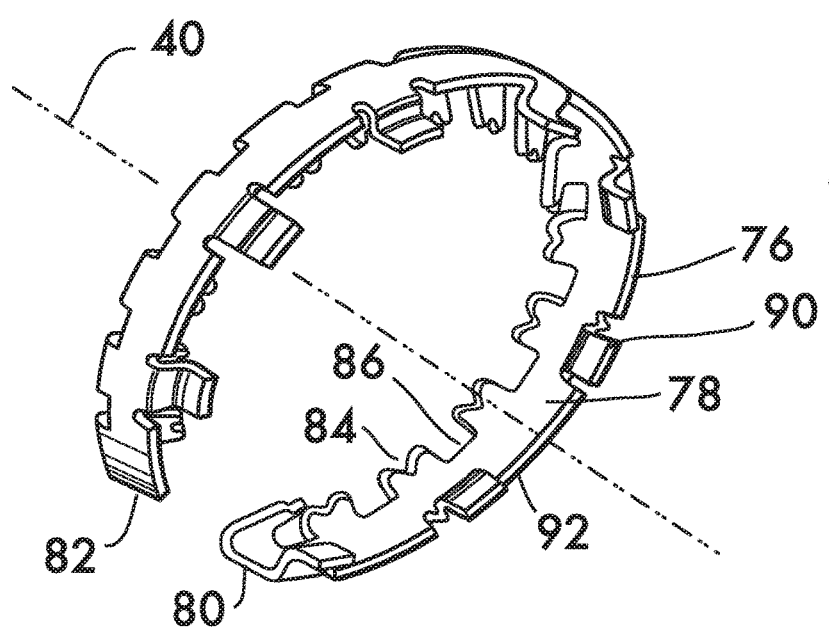
FIG. 5 is an isometric view of an example retainer used with the example coupling of FIG. 1.
Figure 6:
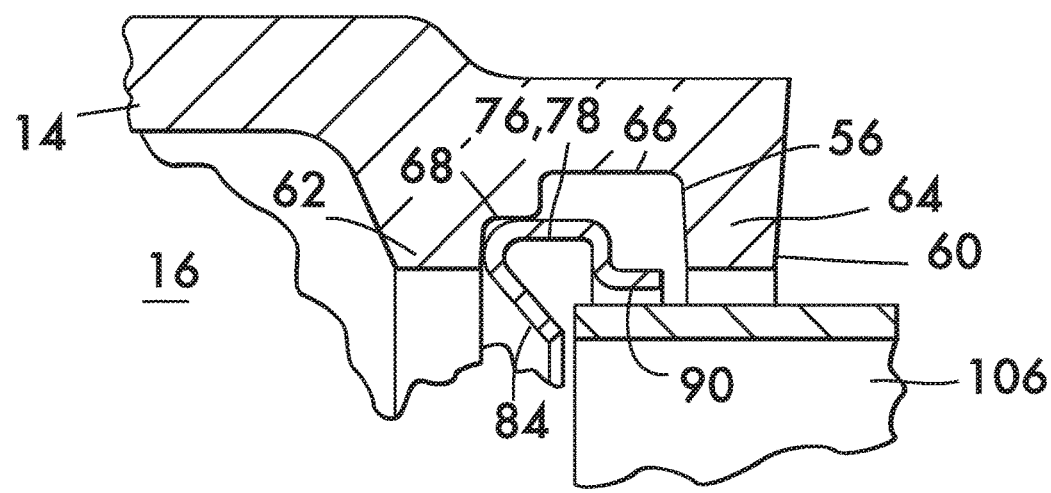
FIG. 6 is a partial cross sectional view of a portion of the example coupling shown in FIG. 1.

As shown in FIG. 5, at least one, in this example, a plurality of tabs 90 are positioned along an edge 92 oppositely disposed from edge 86. As shown in FIG. 4, tabs 90 are oriented substantially perpendicular to the line 88 and are offset from the band 78 toward axis 40 arranged coaxially with the central space 16. This offset of tabs 90 permits them to overlie the second floor 68, and the band 78 to overlie the first floor 66, when retainers 76 are properly oriented within respective channels 54 and 56 as shown in FIGS. 3 and 4. Proper assembly of the retainers 76 within the channels 54 and 56 permits pipe elements to be inserted into a pre-assembled coupling 10 as described below. However, as shown in FIG. 6, the channels 54 and 56 (56 shown) and the retainers 76 are sized such that if the coupling 10 is improperly assembled with the band 78 overlying the second floor 68 and the tabs 90 overlying the first floor 66 a pipe element is prevented from being inserted into the coupling, also described below.

As shown in FIG. 3, segments 12 and 14 further comprise a third channel 94. Channel 94 is positioned between the first and second channels 54 and 56 (or adjacent to the first channel if the second channel is not present) and faces the central space 16. Channel 94 receives a ring seal 96 which ensures a fluid tight joint. Ring seal 96 is formed of a flexible, resilient material such as EPDM or other rubber compounds and has inner surfaces 98 sized to receive pipe elements when they are inserted into the central space 16 as described below. A pipe stop 100 is positioned between inner surfaces 98. The pipe stop projects into the central space 16 and limits insertion of pipe elements by engaging the pipe elements when they are inserted into coupling 10 to the desired depth. Ring seal 96 also has an outer surface 102 that is sized to engage and support the segments 12 and 14 in spaced apart relation as shown in FIGS. 1 and 3. One or more of the bands 78 may also cooperate with the ring seal 94 to support the segments 12 and 14 in spaced apart relation. The separation of the segments 12 and 14, when supported by the ring seal 96 and/or band or bands 78, is sufficient to permit pipe elements to be inserted into the coupling when it is in its pre-assembled state (FIGS. 1, 2 and 3). FIG. 3 shows an example channel configuration wherein the second floors 68 are positioned between the first floors 66 and the third channel 94. In this example the tabs 90 project toward the third channel 94 when the retainers 76 are properly oriented within the coupling 10.

Figure 1A:
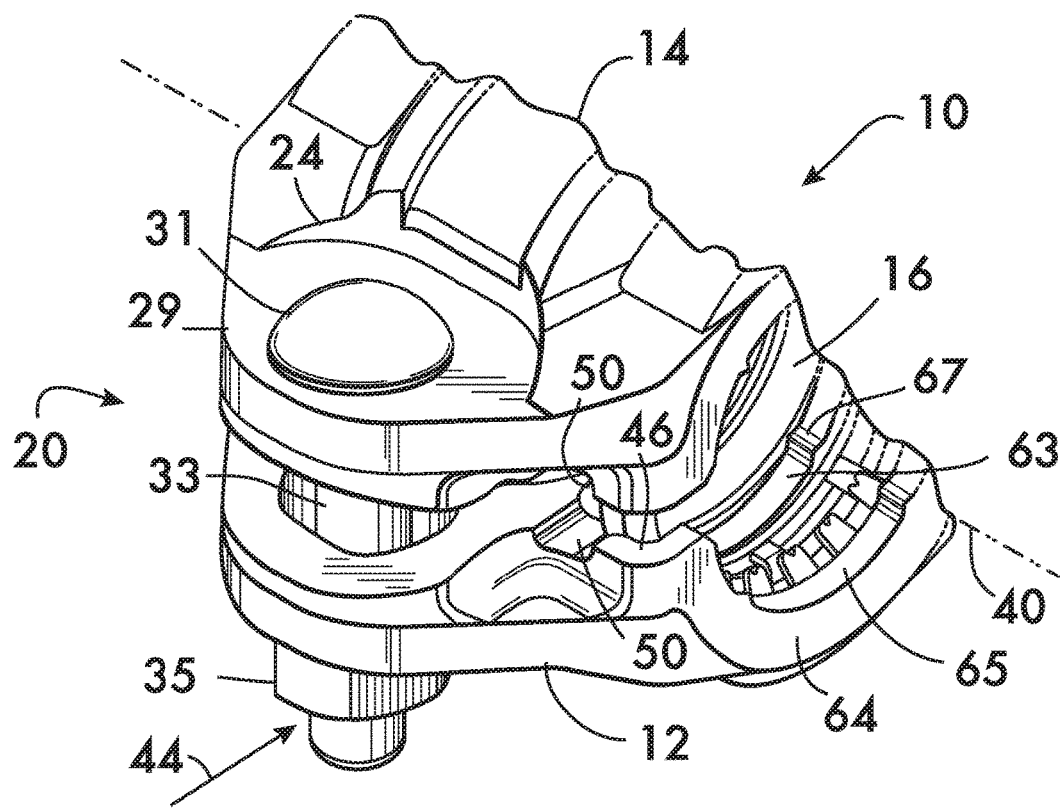
FIG. 1A is a partial isometric view of the coupling shown in FIG. 1 rotated 90° about line 3-3.

As shown in FIG. 1, coupling 10 further comprises a first aperture 42 in segment 12. In this example aperture 42 is aligned with the first channel 54 and provides a line of sight 44 toward the central space 16. In this example embodiment aperture 42 is positioned at the interface 46 between segments 12 and 14 and is formed as a trough 48 in both segments 12 and 14. The troughs 48 in each of the segments 12 and 14 are aligned so that when the segments are drawn into engagement (FIG. 8) they provide a view toward the central space 16 to permit visual confirmation that a pipe element is present, and seated at least past the retainer. As shown in FIG. 1A, a second aperture 50 is also positioned in at least one of the segments 12 and 14. The second aperture 50 is also aligned with the second channel 56 in this example embodiment (see FIG. 3) and also provides a line of sight 44 toward central space 16. Again, in the example embodiment 10 illustrated, the second aperture 50 is positioned between the segments 12 and 14. Aperture 50 is also formed by troughs 48 at the interface 46 between the segments 12 and 14. The second aperture also permits visual confirmation that a pipe element is present within the central space 16.

As shown in FIGS. 1, 1A and 3, each segment 12 and 14 also comprises first and second arcuate surfaces 63 and 65 respectively positioned on sidewalls 62 and 64. Arcuate surfaces 63 and 65 face the central space 16 and a plurality of projections 67 may be positioned on each arcuate surface 63, 65. Projections 67 are arranged in spaced relation to one another along the arcuate surfaces 63 and 65 and project toward the central space 16. Projections 67, when clamped into engagement with the pipe element outer surface increase joint stiffness and accommodate a wider tolerance range on the pipe outer diameter as described below.

Figure 7:
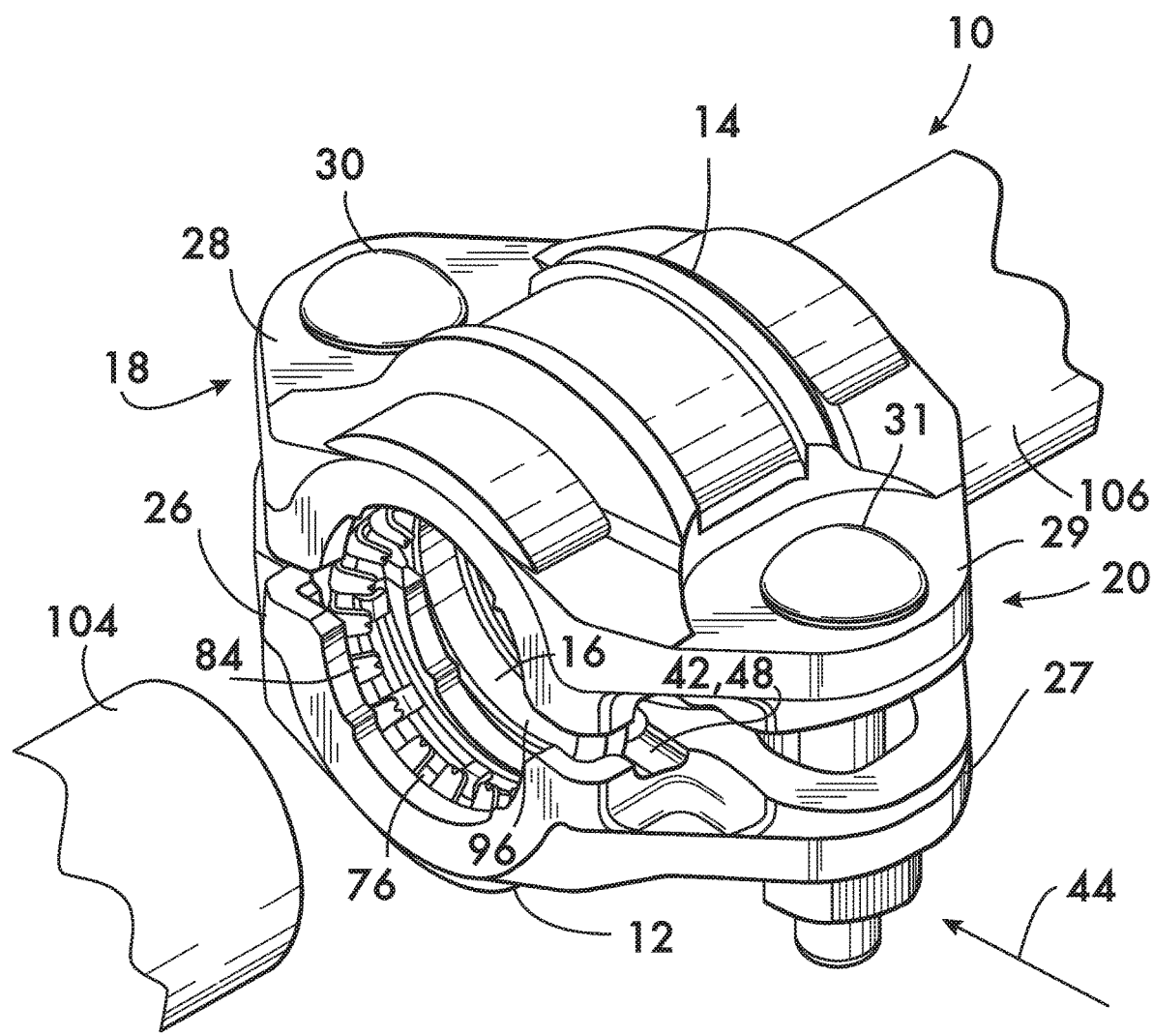
FIG. 7 is an isometric view illustrating assembly of a pipe joint using a coupling as shown in FIG. 1.
Figure 8:
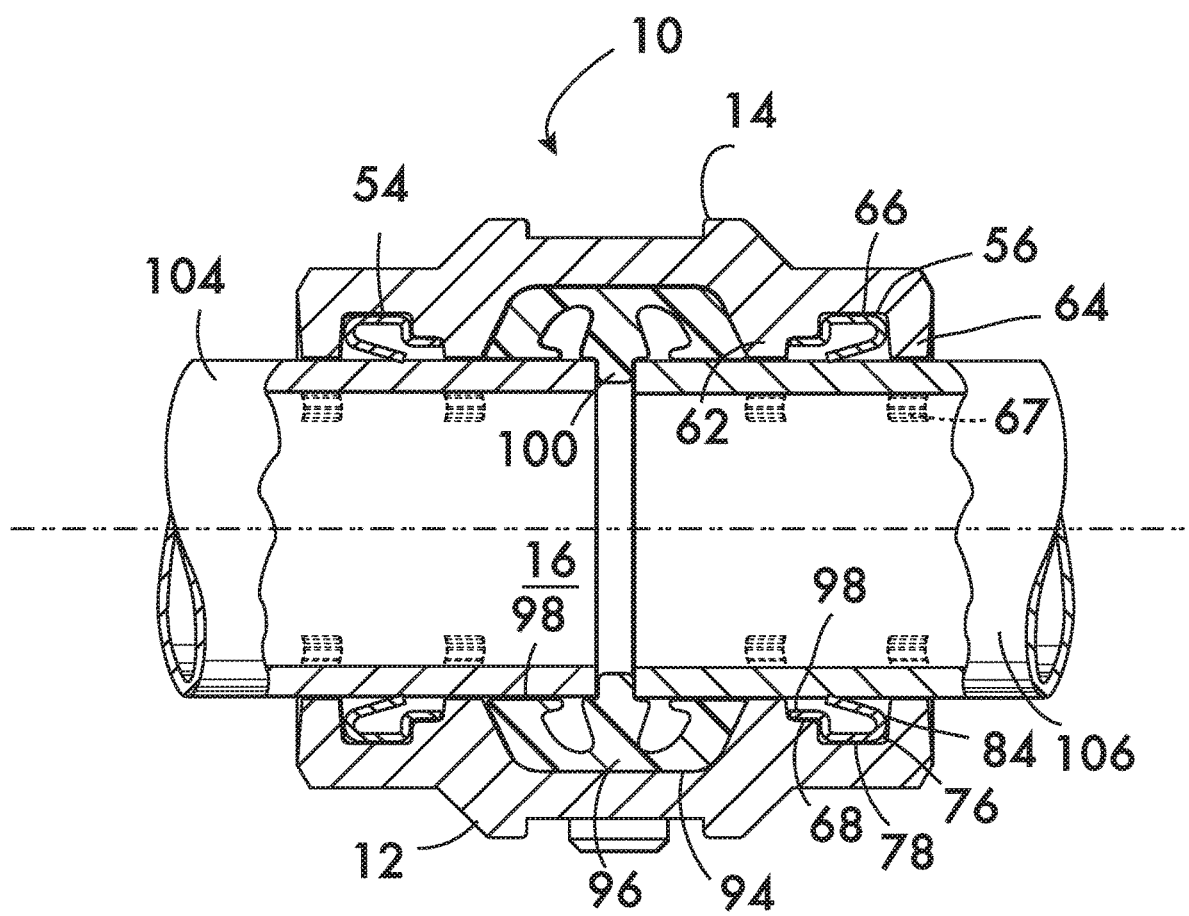
FIG. 8 is a sectional view illustrating assembly of a pipe joint using a coupling as shown in FIG. 1.

Operation of the example coupling 10 is illustrated in FIGS. 7 and 8. As shown in FIG. 7, coupling 10 is provided in the pre-assembled state, with the segments 12 and 14 attached to one another end to end using the attachment member 18 (comprising lugs 26 and 28 and fastener 30) and the attachment member 20 (comprising lugs 27, 29 and fastener 31). The segments 12 and 14 are held apart in spaced relation sufficient to permit insertion of pipe elements 104 and 106 into the central space 16 by the ring seal 96, the retainers 76, or, by a combination of the retainers 76 and the ring seal 96. With reference to FIG. 4, as pipe element 106 is inserted into central space 16, the retainer 76, being properly oriented with band 78 overlying the first floor 66 and the tabs 90 overlying second floor 68, has a radius of curvature which allows the pipe element to clear teeth 84 which project into the central space 16 when the coupling 10 is in the preassembled state. However, if, as shown in FIG. 6, the retainer 76 is oriented improperly, with the band 78 overlying the second floor 68, the retainer's radius of curvature is smaller and teeth 84 effectively prevent insertion of the pipe element 106 into the central space 16 with the segments 12 and 14 in spaced apart relation in the pre-assembled state. This cooperation between the retainer 76, its tabs 90, teeth 84, and the first and second floors 66 and 68 of channels 54 and 56 prevent improper assembly of a pipe joint using coupling 10. If the pipe elements 104 and 106 could be inserted with the retainer teeth 84 facing in the wrong direction (FIG. 6) then the teeth will not be self-actuating against forces which would draw or push the pipe element out of the coupling. Thus the retainer would provide reduced mechanical restraint.

Once both pipe elements 104 and 106 are inserted into the central space engaging the pipe stop 100 and respective inner surfaces 98 of ring seal 96 (FIG. 8) the fasteners 30 and 31 are tightened (see FIG. 1). Tightening the fasteners 30 and 31 draws the segments 12 and 14 toward one another, and, as shown in FIG. 8, the segments compress the ring seal 96 and the retainers 76 against the pipe elements 104 and 106. Compression of ring seal 96 forms a fluid tight seal and compression of retainer 76 forces teeth 84 into mechanical engagement with the outer surfaces of pipe elements 104 and 106 to form a secure joint. The advantage of the angular orientation of teeth 84 is readily apparent, as it causes the teeth to be self-actuating and resist axial forces which would draw or push the pipe elements out of engagement with the coupling 10. As shown in FIG. 7, apertures 42 and 50 (42 shown), aligned with the channels 54 and 56, permit a line of sight 44 toward the central space 16 which allow confirmation that the pipe elements 104 and 106 are engaged by the teeth 84 of the retainer 76.

Projections 67 are also forced into engagement with the pipe elements 104 and 106 as the segments 12 and 14 are drawn toward one another. The projections 67 add stiffness to the joint between the coupling 10 and the pipe elements 104 and 106 upon their engagement with the outer surfaces of the pipe elements. Additionally, the projections 67 allow the coupling 10 to accommodate a larger pipe outer diameter tolerance in combination with known manufacturing tolerances for coupling 10. When the outer diameter of pipe elements 104 and 106 is near the small end of the tolerance range the presence of the projections 67 ensures mechanical engagement between the coupling 10 and the pipe elements 104 and 106. However, when the pipe diameter is at the large end of the tolerance range the projections will tend to deform the outer surface of the pipe elements locally, and projections 67 may also deform. For couplings 10 used with plain end pipe elements this is particularly advantageous as plain end couplings are typically designed so that the arcuate surfaces 63, 65 (see FIG. 3) do not engage the outer surfaces of the pipe elements. This arrangement ensures that the clamping force provided by the fasteners 30 and 31 (see FIG. 2) is fully applied to the retainers 76. Were the arcuate surfaces 63, 65 of the coupling 10 to engage the pipe outer surface directly, the clamping force would be divided between contact of the arcuate surfaces with the pipe and contact between the retainers 76 and the pipe elements. Because the surface areas of projections 67 are small relative to the arcuate surfaces 63, 65, and contact the pipe element outer surface only at discrete points, only minimal clamping force from the fasteners 30 and 31 need to be diverted into contact between the projections 67 and the pipe elements 104 and 106 to provide enhanced stiffness without compromising the axial retention provided by the retainers 76.

Operation of the example coupling 10 can be viewed as illustrative of a method of joining pipe elements comprising inserting a first pipe element (106) into a central space (16) defined by a plurality of segments (12, 14) attached to one another end to end in spaced relation sufficient to permit insertion of the pipe elements (FIG. 7, showing coupling 10 in the pre-assembled state). Next, observing, through a first aperture (50) in at least one of the segments, whether or not the first pipe element is present within said central space. A further method step comprises inserting at least a second pipe element (104) into the central space and then observing, through a second aperture (42) in at least one of the segments, whether or not the second pipe element is present within the central space. The method may further comprise adjusting positions of the pipe elements within the central space if the pipe elements are not present within the central space, and then drawing the segments toward the central space and into engagement with the pipe elements, as shown in FIG. 8, once the pipe elements are observed to be present within the central space.

What is claimed is:

1. A coupling for joining pipe elements, said coupling comprising:
   a plurality of segments attached to one another end to end surrounding a central space for receiving said pipe elements, each of said segments comprising:
   first and second channels positioned on opposite sides of said segments, each of said channels extending between said ends of said segments and having a first floor and a second floor facing said central space, said first floor having a greater radius of curvature than said second floor;
   first and second retainers positioned respectively in said first and second channels, each of said retainers comprising a band having oppositely disposed ends, a plurality of teeth being positioned along one edge of said band and projecting toward said central space, at least one tab being positioned along an opposite edge of said band, said band overlying said first floor, said at least one tab overlying said second floor when said retainers are positioned within said channels.

2. The coupling according to claim 1, further comprising a plurality of said tabs.

3. The coupling according to claim 1, further comprising:
   a third channel positioned between said first and second channels in each of said segments, said third channels extending between said ends of said segments and facing said central space.

4. The coupling according to claim 3, wherein said at least one tab projects toward said third channel.

5. The coupling according to claim 1, wherein said teeth are oriented angularly with respect to a line extending radially from an axis arranged coaxially with said central space.

6. The coupling according to claim 1, wherein said at least one tab is oriented perpendicularly to a line extending radially from an axis arranged coaxially with said central space.

7. The coupling according to claim 1, wherein said at least one tab is offset from said band toward an axis arranged coaxially with said central space.

8. The coupling according to claim 1, comprising no more than a first and a second of said segments joined end to end surrounding said central space.

9. The coupling according to claim 8, further comprising first and second attachment members positioned at opposite ends of said first and second segments, at least one of said attachment members being adjustably tightenable for drawing said first and second segments toward one another.

10. The coupling according to claim 9, wherein said first attachment member comprises:
    first and second lugs positioned respectively on said first and second segments, said first and second lugs being in facing relation;
    a first fastener extending between said first and second lugs, tightening of said first fastener drawing said segments toward one another.

11. The coupling according to claim 10, wherein said second attachment member comprises:
    third and fourth lugs positioned respectively on said first and second segments, said third and fourth lugs being in facing relation;
    a second fastener extending between said third and fourth lugs, tightening of said second fastener drawing said segments toward one another.

12. The coupling according to claim 1, further comprising a first aperture in at least one of said segments, said first aperture providing a line of sight toward said central space.

13. The coupling according to claim 12, wherein said first aperture is aligned with said first channel.

14. The coupling according to claim 12, wherein said first aperture is positioned between two of said segments.

15. The coupling according to claim 14, wherein said first aperture comprises a trough positioned at an interface between said two segments.

16. The coupling according to claim 12, further comprising a second aperture in at least one of said segments, said second aperture providing a line of sight toward said central space.

17. The coupling according to claim 16, wherein said second aperture is aligned with said second channel.

18. The coupling according to claim 16, wherein said second aperture is positioned between two of said segments.

19. The coupling according to claim 18, wherein said second aperture comprises a trough positioned at an interface between said two segments.

20. The coupling according to claim 1, further comprising:
a ring seal positioned within said third channels, said ring seal having an inner surface sized to receive said pipe elements and an outer surface sized to support said segments in spaced apart relation sufficient to permit insertion of said pipe elements into said central space while said segments are attached to one another.

21. The coupling according to claim 20, wherein said retainer bands are sized to cooperate with said ring seal to support said segments in said spaced apart relation.

22. A coupling for joining pipe elements, said coupling comprising:
a plurality of segments attached to one another end to end surrounding a central space for receiving said pipe elements, each of said segments comprising:
at least a first channel positioned on a first side of said segments, said first channel extending between said ends of said segments;
a first aperture in at least one of said segments, said first aperture providing a line of sight toward said central space,
wherein said first channels have a first floor and a second floor facing said central space, said first floor having a greater radius of curvature than said second floor;
a first retainer positioned in said first channels, said first retainer comprising a band having oppositely disposed ends, a plurality of teeth being positioned along one edge of said band and projecting toward said central space, at least one tab being positioned along an opposite edge of said band, said band overlying said first floor, said tabs overlying said second floor when said retainer is positioned within said channels.

23. The coupling according to claim 22, wherein said first aperture is aligned with said first channel.

24. The coupling according to claim 22, wherein said first aperture is positioned between two of said segments.

25. The coupling according to claim 24, wherein said first aperture comprises a trough positioned at an interface between said two segments.

26. The coupling according to claim 25, wherein said second aperture is positioned between two of said segments.

27. The coupling according to claim 26, wherein said second aperture comprises a trough positioned at an interface between said two segments.

28. The coupling according to claim 22, further comprising a second aperture in at least one of said segments, said second aperture providing a line of sight toward said central space.

29. The coupling according to claim 28, wherein said second aperture is aligned with a second channel positioned on a second side of said segments opposite said first side.

30. The coupling according to claim 22 further comprising a plurality of said tabs.

31. The coupling according to claim 22, further comprising:
a third channel positioned adjacent to said first channels in each of said first and second segments, said third channels extending between said ends of said segments and facing said central space.

32. The coupling according to claim 22, wherein said teeth are oriented angularly with respect to a line extending radially from an axis arranged coaxially with said central space.

33. The coupling according to claim 22, wherein said at least one tab is oriented perpendicularly to a line extending radially from an axis arranged coaxially with said central space.

34. The coupling according to claim 22, wherein said at least one tab is offset from said band toward an axis arranged coaxially with said central space.

35. The coupling according to claim 31, wherein said at least one tab projects toward said third channel.

36. The coupling according to claim 22, comprising at most a first and a second of said segments.

37. The coupling according to claim 36, further comprising first and second attachment members positioned at opposite ends of said first and second segments, at least one of said attachment members being adjustably tightenable for drawing said first and second segments toward one another.

38. The coupling according to claim 27, wherein said first attachment member comprises:
first and second lugs positioned respectively on said first and second segments, said first and second lugs being in facing relation;
a first fastener extending between said first and second lugs, tightening of said first fastener drawing said segments toward one another.

39. The coupling according to claim 38, wherein said second attachment member comprises:
third and fourth lugs positioned respectively on said first and second segments, said third and fourth lugs being in facing relation;
a second fastener extending between said third and fourth lugs, tightening of said second fastener drawing said segments toward one another.

40. The coupling according to claim 31, further comprising:
a ring seal positioned within said third channels, said ring seal having an inner surface sized to receive said pipe elements and an outer surface sized to support said segments in spaced apart relation sufficient to permit insertion of said pipe elements into said central space while said segments are attached to one another.

41. The coupling according to claim 40, wherein said retainer bands are sized to cooperate with said ring seal to support said segments in said spaced apart relation.

* * * * *